United States Patent
Clavel

(10) Patent No.: US 7,006,367 B2
(45) Date of Patent: Feb. 28, 2006

(54) POWER FACTOR CONTROLLER

(75) Inventor: Robert Clavel, St-Hubert (CA)

(73) Assignee: PrecisionH2 Power Inc., Hudson ( * ) Notice: Subject to any disclaimer, the term of this patent is extended or adjusted under 35 U.S.C. 154(b) by 50 days.

(21) Appl. No.: 10/500,164

(22) PCT Filed: Jan. 9, 2003

(86) PCT No.: PCT/CA03/00009

§ 371 (c)(1),
(2), (4) Date: Jun. 17, 2004

(87) PCT Pub. No.: WO03/058797

PCT Pub. Date: Jul. 17, 2003

(65) Prior Publication Data

US 2005/0057237 A1    Mar. 17, 2005

Related U.S. Application Data

(60) Provisional application No. 60/347,052, filed on Jan. 11, 2002.

(51) Int. Cl.
    *H02M 7/04* (2006.01)
(52) U.S. Cl. .................................................. 363/89
(58) Field of Classification Search ................ 363/76, 363/78–81, 84, 89, 125, 127; 323/222, 282, 323/299
See application file for complete search history.

(56) References Cited

U.S. PATENT DOCUMENTS

| 5,357,418 A | 10/1994 | Clavel |
| 5,602,465 A * | 2/1997 | Clemente ..................... 323/300 |
| 6,191,676 B1 | 2/2001 | Gabor |
| 6,373,734 B1 * | 4/2002 | Martinelli .................... 363/89 |
| 6,900,623 B1 * | 5/2005 | Yang et al. ................. 323/282 |

FOREIGN PATENT DOCUMENTS

| EP | 0 580 919 A1 | 2/1994 |
| EP | 0 631 371 A2 | 6/1994 |

OTHER PUBLICATIONS

E. Dallago et al.; Power Factor Corrector with a Multiplier Control . . . ; ENE '97 Trondheim; Aug. 9, 1997; pp. 2918-2922; University of Pavia; Italy.

* cited by examiner

*Primary Examiner*—Gary L Laxton
(74) *Attorney, Agent, or Firm*—George J. Primak

(57) ABSTRACT

A power factor controller or corrector is provided in a regulated power supply circuit, in which the load and line regulation circuitry is separate from one another and in which the line regulation is provided with a $1/x^2$ modulator in which the switching frequency is inversely proportional to the square of the line voltage.

6 Claims, 3 Drawing Sheets

US 7,006,367 B2

POWER FACTOR CONTROLLER

This application claims benefit of prior provisional application No. 60/347,052 filed on Jan. 11, 2002.

FIELD OF THE INVENTION

The present invention relates to an electronic power supply and more particularly to a power factor controller or corrector (PFC). This invention is related to U.S. Pat. No. 5,357,418 issued Oct. 18, 1994 of the same inventor, which concerns a hybrid power supply with improved regulation and which is incorporated herein by reference.

BACKGROUND OF THE INVENTION

Presently known PFCs have the following drawbacks:

They use a double feedback loop, i.e. one to sense the line current and the other to sense the output voltage. This arrangement requires heavy calculating power in the chips that generate the driving pulse width to the power FETs;

These chips have important limitations that end up in incoherent system equations for calculations of the chokes and power FETs characteristics, thus requiring a lot of empirical testing from the designer or trouble shooter. Besides, it still remains unclear whether these chips are usable above 500 watts. All these factors lead to very substantial development and maintenance costs.

This is probably the major reason why the U.S. Government has been reluctant to adopt the IEC 555-2 norm for the last decade.

An objective of the invention is to eliminate the above deficiencies and provide a simple system allowing use of a single basic equation and to increase predictability of the circuitry.

Another objective of the invention is to provide a system which is applicable to any power output (watts to kilowatts).

SUMMARY OF THE INVENTION

In essence, the power factor controller or corrector of the present invention comprises separating load and line regulations in the power supply circuit and providing a $1/x^2$ modulator module for the line regulation in which switching frequency is inversely proportional to the square of the line voltage. Furthermore, the load regulation is preferably achieved by a 1/v pulsewidth generator which generates a pulse duration that is inversely proportional to the voltage from a differential gain circuitry that produces a control voltage which is proportional to the difference between a fraction of output voltage and a fixed reference voltage. Also, a loop delay may be provided between the differential gain circuitry and the 1/v pulse generator.

The power factor controller of the present invention may be advantageously combined with a hybrid power supply, such as disclosed and claimed in U.S. Pat. No. 5,357,418 and having a 1/x frequency modulating module. The combination comprises cascading the $1/x^2$ module with the 1/x module.

According to the present invention, the PFC boost circuit will exhibit the following properties:

The AC line current will be sinusoidal, i.e. will look like the AC line voltage, thus bring the power factor close to 1 and the harmonic content of AC current will be close to 0. Such characteristics would meet IEC 555-2 requirements and other subsequent IEC norms;

The output DC voltage will be about 450 VDC for AC line variations from 85 VAC to 265 VAC.

Shown input/output relationship represents a theoretical view on the present power factor corrected power supplies.

DETAILED DESCRIPTION OF THE INVENTION

Figure 1:
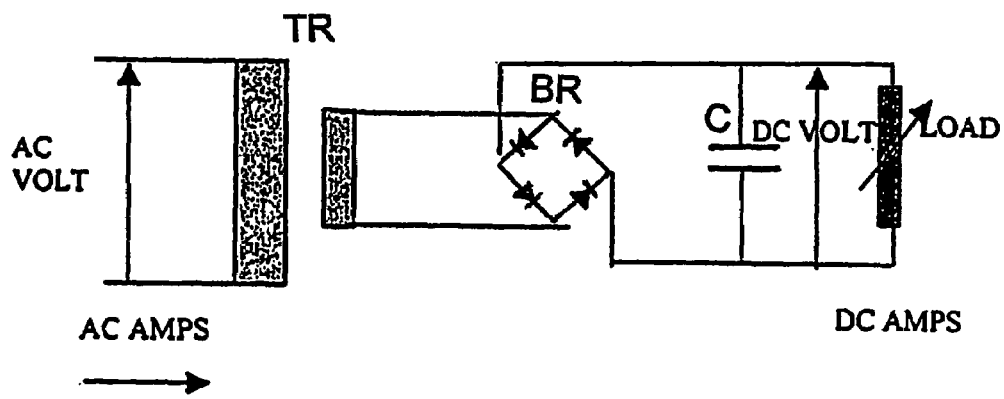
FIG. 1 shows a previously used electronic power supply which is neither regulated nor PFC controlled.

An electronic power supply can be defined as a power converter converting AC line voltage (115 VAC or 220 VAC) into a DC voltage necessary to feed any electronic circuitry. The simplest electronic power supply is shown on FIG. 1 and includes a very primitive transformer (TR), rectifying bridge (BR) of capacitor (C) type. However, such a simple arrangement is seldom used due to the following reasons:

output DC voltage will change whenever the line voltage changes, thus not providing any reliable line regulation;

even if the line voltage is stable, DC voltage will change if current is drawn by the load changes, thus not providing any load regulation;

at 60 Hz, weight and size of transformer will become prohibitive;

capacitor charging and discharging will produce a high peak current demands, i.e. harmonics of 60 Hz. Such generation of harmonics was tolerated until Jan. 1, 2001, but is no longer tolerated in Europe and soon will not be tolerated in North America.

The above deficiencies are particularly addressed by the system of the present invention. Electronic industry needs power supplies having much better performances than the circuit shown in FIG. 1 can offer, since modem power supplies are much more complex.

The typical power supply users will expect their electronic power supply to fulfill not only one but all of the following conditions:

high quality regulations;

high efficiency;

small size and weight;

high power factor.

High quality regulations means that:

generated output voltage essentially does not change when line voltage or load changes (typically less than 0.1%);

no noise is essentially superimposed on the output voltage (typically less than 1 millivolt);

output impedance of the supply is negligible (typically 10 milliohms);

transient response is fast (typically 10 microseconds).

Effects of low quality regulations are:

Output voltage varying too much, which is not too critical for digital circuitry, but is very annoying for analog circuitry such as timers, A/D converters, multipliers, integrators, etc.

Noise will randomly trigger flip-flops and provoke intermittent and unexpected breakdown in digital circuitry;

Transient response is too low and severely limits the frequency response of user's power circuitry, such as power amplifiers, plasma electrodes, etc.

High efficiency means the following:

All power which is not used in the load is going to generate heat in the power supply of the user's circuitry. In the past, 75% to 80% efficiency was considered to be acceptable, but in the future, it may be insufficient in view of the following reasons:

simple mathematics show that a power supply having 75% efficiency will heat up not 20%, but 500% more if compared with a 95% efficiency power supply;

there is a strong correlation between efficiency and other parameters, such as size, weight, noise content and reliability.

Effect of poor efficiency is:

Above all, loss of reliability, which is a highly non-linear function of temperature. If temperature increases 10° C., MTBF decreases several times.

Small size and weight means the following:

At the present time, size/weight proportions are about 2–3 cubic inches/1 lb (70–100 cubic cm/1 kg) per regulated 1 watt produced. The proportion could be even more if the user can handle the heat dissipation problem with which he does not feel comfortable unless he is a heat transfer expert.

High power factor means the following:

Power supply should consider the hydro line as a pure ohmic resistor, i.e. current drawn from the grid is sinusoidal with less than 3 amps of harmonic 3 content. Ideally, the power factor should be around 99%. However, nearly all power supplies designed before 1990, and quite a few now have a power factor of around 66%.

Effect of poor power factor is:

Non-compliance with IEC 555-2 norm issued in 1990, which is compulsory in Europe since Jan. 1, 2001, and is expected to become compulsory by the CSA (Canadian Standard Association) in 2002 and in the U.S. in 2003.

Present state of the art:

Major power supply makers (Kepco, Lambda, Power One, Acopian, etc.) might satisfy one or two of the above four factors, but none of them satisfy all four. This may be explained as being due to the following problems:

Satisfying all four factors together is extremely difficult due to conflicting requirements between efficiency and quality of regulations;

Paradoxically, power supply development has been considered for a long time a non-glamorous technology and relatively little R&D has been done when compared with the field of communications and computers.

In view of the above, the user still has to choose between bad regulation and efficiency with some risk of malfunctions always present. Cost of regulated supplies has not come down, like the rest of electronic gear. A custom power supply of average complexity can take more than 1 year of development and cost around $200,000. Some recent special 1 kw power supplies development had taken 5 years and 1.5 million dollars.

The PFC controller of the present invention was designed with a view of the following factors:

to satisfy impending compulsory PFC requirements for all power supplies above 300 watts in view of IEC 555-2 and other IEC norms;

need for PFC for 5 kilowatts power supply for plasma electrodes;

failure to find a reliable design information and off-the-shelf chips for power above 500 watts;

knowledge of tremendous difficulties of developers to achieve PFC at only 1 kilowatt;

finding that some principles used in U.S. Pat. No. 5,357,418 could also be used for the system of the present invention, such as clear separation of line and load regulations and hyperbolic modulations.

The PFC controller of the present invention uses the same philosophy as U.S. Pat. No. 5,357,418 clearly separating the line regulation (open loop) from the load regulation (closed loop). This feature allows the use of a single basic equation and to increase predictability of the circuitry. Such approach is general and may be applicable to any power output (watts to kilowatts).

It can be shown both mathematically and experimentally that the power output of the basic boost circuitry of FIG. 1 is:

$$P = \frac{KFV^2(PW)^2}{L}$$

Wherein:

P is wanted output power in watts;

K is constant;

F is frequency of switching of power FETs in kilohertz;

V is line RMS voltage in volts;

PW is pulsewidth in microseconds;

L is value of power inductance in millihenries.

Figure 2:
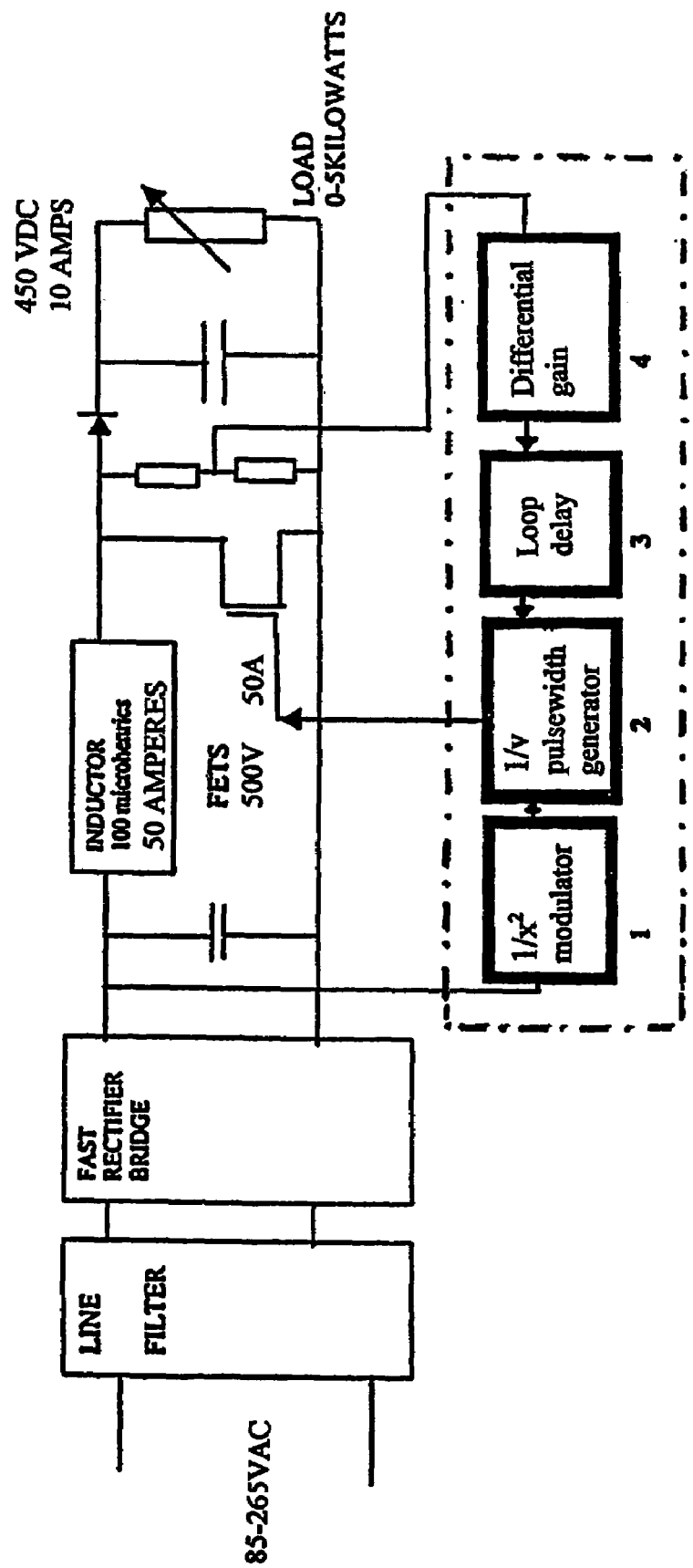
FIG. 2 shows a block-diagram of the PFC control system of the present invention.

Referring now to FIG. 2 of the drawings which shows a block-diagram of the PFC controller of the present invention, it provides the following:

Line regulation step

For a given constant power, if line varies for example from 110 v to 220 v (factor of 2), choke will tend to force four times more power into the load by raising output DC voltage two times. To prevent this, frequency has to be decreased four times. Consequently, switching frequency has to be inversely proportional to the square of the line voltage. This process is achieved by block 1 representing $1/x^2$ modulator which is assigned to regulate the line variations. It produces a frequency proportional to the inverse of the square of the line voltage. For example, if the line voltage is 115 VAC, frequency generated by block 1 will be 80 kilohertz. If the line voltage is 230 VAC, frequency generated by block 1 will be 20 kilohertz.

Load regulation step

In case the load demand varies abruptly, for example from 5 KW to 0 watts, choke will tend to force 5 KW into an open circuit, which will raise the output voltage to infinity if pulsewidth is not decreased rapidly to about 0 microseconds. In other words, pulsewidth has to be decreased very fast when output voltages increase.

Block 2 represents a 1/v pulsewidth generator which will generate a pulse duration which is inversely proportional to V, wherein V comes from differential gain represented by block 4. Block 4 produces a control voltage which is proportional to the difference between a fraction of the output voltage and a fixed reference voltage.

Loop delay represented by block 3 is analogous to a time lag circuitry used in analog control loops, such as Bode or Nyquist criterion techniques.

In conclusion, block 1 is provided for line regulation and blocks 2, 3 and 4 are provided for the load regulation. For example, if the load varies from 5 kilowatts to 0 kilowatts (open circuit), pulsewidth will vary from 5 microseconds to 0 microseconds.

Figure 3:
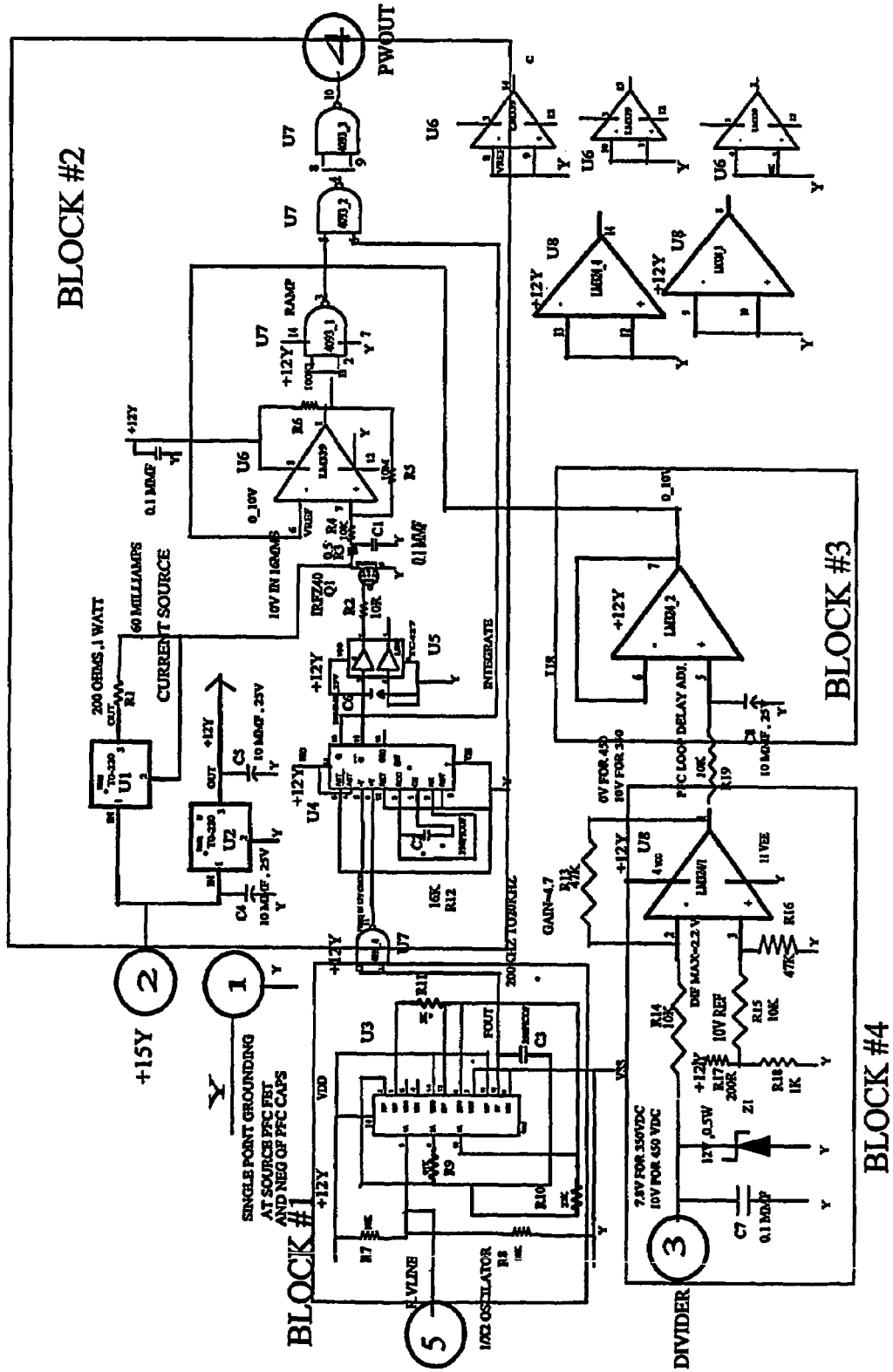
FIG. 3 shows an electronic circuitry illustrations of block-diagram of FIG. 2.

FIG. 3 shows a preferred embodiment of the circuit representing blocks 1–4 of FIG. 2 which are operating in the following manner:

U3 of block 1 is a simple logic CMOS standard (CD 4007) dual complementary pair plus inverter logic gate used for its analog properties. This chip contains one P-channel FET and one N-channel FET which can be used as a non-linear voltage controlled resistor. When connected to inverters of the same chip through R9, R10 and R11, a non-linear voltage controlled oscillator is formed, the frequency of which can be made varying like the inverse of the square of the control voltage applied to pin 3 of U3. Pin 12 of U3 outputs a varying frequency which is applied to U4 of block 2, which is a standard CMOS (CD4047). U4 is producing fixed duration pulses 100 nanoseconds wide. These short pulses are applied to U5 FET driver (TC 427) which puts element Q1 (IRFZ40) of block 2 "ON" in about 30 nanoseconds. Whenever Q1 conducts, capacitor C1 of block 2 is discharging in about 100 nanoseconds for each period of the frequency produced by U3. Whenever pulse from U4 is low, Q1 is "OFF" and C1 starts to charge up as a ramp due to a constant current applied by U1 of block 2 current source. Voltage of C1 is applied to input 1 of U6 comparator of block 2. Input 2 of the comparator U6 receives a varying DC reference produced by element U8 of block 4. Whenever voltage at C1 reaches the value of the DC reference, comparator U6 switches to a logic "1" state. With subsequent proper gating, net result is a pulse of duration proportional to the voltage coming from pin 1 of U8 and is occurring at each period of frequencies produced by U3.

Voltage appearing on the load side is firstly divided in block 4 into 7.8 VDC corresponding to 350 VDC and 10 VDC corresponding to 450 VDC. Difference between this voltage and a fixed reference voltage of 10 V is amplified by a factor of 4.7. Thus, if 10 VDC corresponding to 450 VDC appears at divider, output pin 1 of U8 will be "0" V. This will produce a pulsewidth of 0 microseconds at U6, i.e. no energy will be transferred to the load. In this case, a voltage of 450 VDC at the load means that the circuit is open. In case the voltage at the divider is 7.8 VDC corresponding to 350 VDC as full load situation, output at pin 1 of U8 will be maximum, and subsequently, pulsewidth produced at U6 will be maximum, thus allowing transfer of energy to the load and increasing the output voltage back to 450 VDC. Practically, loading process will not vary so abruptly as "no load"—"full load", and pulsewidth will be adjusted by control loop continuously and slowly. In this case, variations from "no load" to "full load" (or the reverse) occurs only at start-up or when the load is accidentally removed (for example, broken connection). Feedback loop will react in both cases, but with some transient effect. Following regulation stages will absorb this transient effect. Such basic principle is valid even in the case of abrupt variations. In view of this fact, pulse width will be adjusted by control loop in any loading circumstances. Elements of block 3, such as R19, C8 and buffer will introduce some delay in the in loop in order to avoid oscillations. The buffer of block 3 comprises amplifier Lm324/2 element, wherein pin 7 strapped to pin 6 provides infinite input impedance at pin 5 and near "0" output impedance at pin 7.

Figure 5:
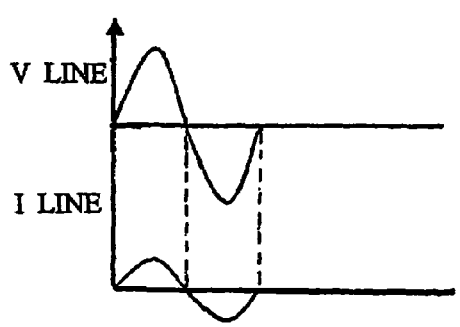
FIG. 5 shows a diagram of voltage/current phases of the present invention.

It should be emphasized that the PFC system of the present invention could be used with any "boost circuitry" whose requirements could be stated as follows:

Output should be a high value (450V to 1000V) regulated DC voltage. Boost circuit can output DC voltage several times higher than the peak voltage;

Input should look to the grid line (110 VAC, 220 VAC, 550 VAC, etc.) like a pure ohmic resistor;

The current drawn should be pure sinusoid (see FIG. 5), in phase with the AC line voltage. The voltage/current relationship shown in FIG. 5 is present in any PFC controlled power supply, including that of the present invention.

Figure 6:
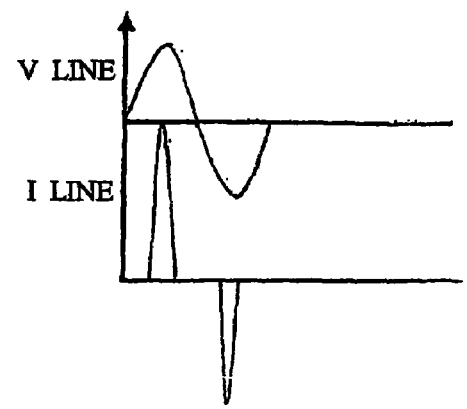
FIG. 6 shows a diagram of voltage/current phases of known power supply systems which are not PCF controlled.

In contrast, FIG. 6 shows a configuration of the current line which is not useful for the PFC system of the present invention. It is normally present in any power supply that has no PFC. The high peak currents of this configuration produce problems in the hydro lines.

All electronic components shown on FIG. 3 represent a preferred embodiment only and had been chosen mainly due to their immediate availability. Any other equivalent elements could be used to provide the same function for the same result.

Figure 4:
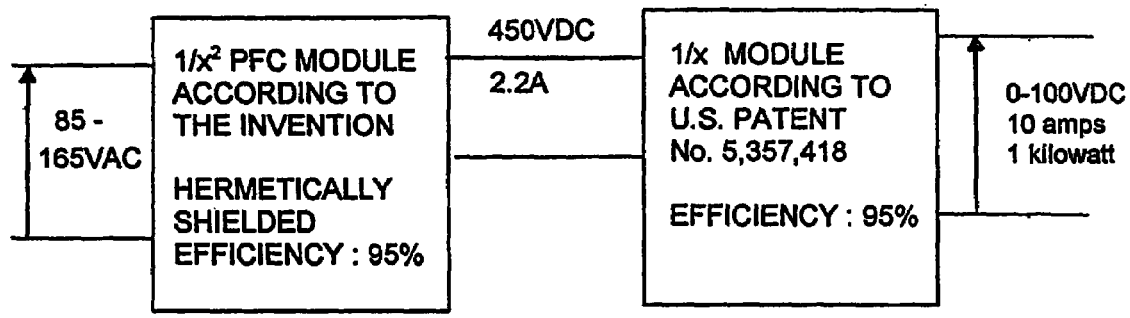
FIG. 4 shows a cascade arrangement of module of the present invention with module of U.S. Pat. No. 5,357,418.

FIG. 4 represents an arrangement according to U.S. Pat. No. 5,357,418 in combination with the PFC controller of the present invention. When cascading one $1/x^2$ PFC module of the present invention and one $1/x$ module of the U.S. Pat. No. 5,357,418, as shown in FIG. 4, it is possible to realize, for example, a 0–100V, 10 amps (1 kilowatt) adjustable regulated power supply.

In this case, the combined performance will be:

Regulation: linear grade, i.e. line+load of 0.01%; transient response–20 microseconds and output impedance–20 milliohms;

Ripple+noise of 1 millivolt peak to peak;

Efficiency: 92.5%;

Power factor: 99%;

Size and weight: 500 cubic inches, 10 lb (2 w/cubic inch, 100 w/lb).

Presently available "linear type" regulated power supplies have the following characteristics:

Regulation: linear grade, i.e. line+load of 0.01%, transient response–20 microseconds, output impedance–20 milliohms;

Ripple+noise: 1 millivolt peak to peak;

Efficiency: 30–40% (2 kilowatts of heat to dissipate internally);

Power factor: 66%;

Size and weight: 2000 cubic inches, 100 lb (0.5 w/cubic inch, 10 w/lb)

Presently available "switching type" regulated supplies have the following characteristics:

Efficiency: 75% (250 watts of heat to dissipate internally);

Power factor: 99%;

Size and weight: 500 cubic inches, 12 lbs (2 w/cubic inch, 80 w/lb)

Regulation: line+load of 0.1%, 0.5%, transient response–2000 to 5000 microseconds, output impedance—unknown;

Ripple+noise: 150 millivolt peak to peak.

In view of the above data, in the presently available regulated power supplies, the customer has to make a difficult choice between a well regulated, but very hot power supply and a cool, but badly regulated power supply. In practice, the customer has to pick the lesser of two evils, but always will have non-negligible risks.

Separate PFC modules do exist, which will deliver 450 VDC outputs, but the customer is left with the problem of converting the 450 VDC to lower voltages. Usually, he adds a switching supply in cascade, which is likely double the RFI output. Besides, such modules are not currently available above 500 watts. Such technology is not very mature even in Europe.

Other advantages of cascading shown in FIG. 4 allows to decrease the development costs of power supplies by a factor of 10 considering the fact that development cost of a medium complexity power supply is about $250,000 with the development time of 18 months. This factor reflects the sale price, since a typical price for a well regulated 1 KW power supply is $5000.00.

The reason for such excessive costs is the fact that most technologies used up to date do not separate the line regulation and the load regulation. Having lines varying by factor of four (85 VAC–265 VAC) and load varying by a factor of infinity (0 watts to 1 kilowatt) make the performance of the feedback loop almost unpredictable, especially since complex magnetic components, such as high frequency transformers and chokers, are in the feedback loops. Net result is that numerous iterations and breadboards have to be built before wanted performances are achieved. In this case, magnetic components very often have to be designed by cut and try guesswork. It all results in expensive debugging time when testing the circuitry.

As a conclusion, it is clear that separating load and line regulation used in the present invention makes analysis coherent and predictable. In this case, equation for determining values of components, especially magnetic components, are numerous, but easily implemented on an Excel spread sheet.

As a result, cascade arrangement of FIG. 4 is the most commercially advantageous for realizations of regulated electronic power supplies, which represent probably over 90% in the market of all power supplies.

A similar, or at least very close arrangement, may be used for efficient, high power battery chargers (kilowatts), efficient, high power current sources (kilowatts) and efficient, high power sinewave inverters (kilowatts).

The invention claimed is:

1. A power factor controller or corrector in a regulated power supply circuit, which comprises separating load and line regulations in the power supply circuit and providing a $1/x^2$ modulator module for the line regulation in which switching frequency is inversely proportional to the square of the line voltage.

2. A power factor controller or corrector according to claim 1, in which the load regulation is achieved by a 1/v pulsewidth generator which generates a pulse duration that is inversely proportional to the voltage from a differential gain circuitry that produces a control voltage which is proportional to the difference between a fraction of output voltage and a fixed reference voltage.

3. A power factor controller or corrector according to claim 2, in which a loop delay is provided between the differential gain circuitry and the 1/v pulse generator.

4. A power factor controller or corrector according to claim 1, combined with a hybrid power supply having a 1/x frequency modulating module, said combination comprising cascading the $1/x^2$ module with the 1/x module.

5. A power factor controller or corrector according to claim 2, combined with a hybrid power supply having a 1/x frequency modulating module, said combination comprising cascading the $1/x^2$ module with the 1/x module.

6. A power factor controller or corrector according to claim 3, combined with a hybrid power supply having a 1/x frequency modulating module, said combination comprising cascading the $1/x^2$ module with the 1/x module.

* * * * *